United States Patent
Yanamandra

(10) Patent No.: US 11,272,346 B2
(45) Date of Patent: *Mar. 8, 2022

(54) ACTIVATING AN EMERGENCY MODE ASSOCIATED WITH A USER DEVICE

(71) Applicant: Capital One Services, LLC, McLean, VA (US)

(72) Inventor: Rajesh Yanamandra, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/948,143

(22) Filed: Sep. 4, 2020

(65) Prior Publication Data

US 2020/0404475 A1 Dec. 24, 2020

Related U.S. Application Data

(63) Continuation of application No. 16/284,814, filed on Feb. 25, 2019, now Pat. No. 10,771,949, which is a
(Continued)

(51) Int. Cl.
  *H04M 11/04* (2006.01)
  *H04W 4/90* (2018.01)
  (Continued)

(52) U.S. Cl.
  CPC .............. *H04W 4/90* (2018.02); *H04M 1/00* (2013.01); *H04W 4/50* (2018.02); *H04W 52/245* (2013.01);
  (Continued)

(58) Field of Classification Search
  None
  See application file for complete search history.

(56) References Cited

U.S. PATENT DOCUMENTS 5,852,408 A 12/1998 Christiansen et al.
6,822,639 B1 11/2004 Silverbrook et al.
(Continued)

OTHER PUBLICATIONS

Emergency Video Calls, "A Video is Worth a Thousand Words," Google Sites, https://sites.google.com/site/emergencyvideo/, Jan. 15, 2009, 4 pages.
(Continued)

*Primary Examiner* — Jinsong Hu
*Assistant Examiner* — Alexander J Yi
(74) *Attorney, Agent, or Firm* — Harrity & Harrity LLP

(57) ABSTRACT

A device may detect an indication to activate an emergency mode associated with the user device. The emergency mode may be associated with gathering data related to an emergency. The device may determine a manner in which to configure a set of components or a set of actions to perform. The set of components may be associated with gathering the data. The device may activate the emergency mode. The emergency mode may be activated by at least one of: configuring the set of components, or performing the set of actions. The device may gather the data utilizing the set of components. The device may dynamically: store the data utilizing one or more memory resources of the user device after gathering the data, or provide the data to another device. The device may determine to terminate the emergency mode.

20 Claims, 12 Drawing Sheets

Related U.S. Application Data continuation of application No. 16/053,520, filed on Aug. 2, 2018, now Pat. No. 10,271,196.

(51) Int. Cl.
*H04W 52/24* (2009.01)
*H04W 4/50* (2018.01)
*H04M 1/00* (2006.01)
*H04W 76/50* (2018.01)
*H04W 4/029* (2018.01)

(52) U.S. Cl.
CPC ............ *H04M 11/04* (2013.01); *H04W 4/029* (2018.02); *H04W 76/50* (2018.02)

(56) References Cited

U.S. PATENT DOCUMENTS

| | | |
|---|---|---|
| 7,177,623 B2 | 2/2007 | Baldwin et al. |
| 8,886,153 B2 | 11/2014 | Velusamy et al. |
| 9,020,106 B2 | 4/2015 | Gupta et al. |
| 10,271,196 B1 | 4/2019 | Yanamandra |
| 10,771,949 B2 | 9/2020 | Yanamandra |
| 2004/0203843 A1 | 10/2004 | Najafi et al. |
| 2005/0036513 A1 | 2/2005 | Clarke et al. |
| 2007/0133356 A1 | 6/2007 | O'Connor |
| 2008/0043641 A1 | 2/2008 | Wilson et al. |
| 2009/0143047 A1 | 6/2009 | Hays et al. |
| 2009/0221262 A1 | 9/2009 | Miwa et al. |
| 2010/0306261 A1 | 12/2010 | Geisner et al. |
| 2011/0021173 A1* | 1/2011 | Randhawa ............... H04W 4/90 455/404.1 |
| 2013/0339019 A1 | 12/2013 | Giancarlo et al. |
| 2014/0273914 A1 | 9/2014 | Mechaley, Jr. et al. |
| 2014/0365907 A1 | 12/2014 | De et al. |
| 2015/0201316 A1 | 7/2015 | Khatibi et al. |
| 2015/0269835 A1* | 9/2015 | Benoit ................ G08B 25/016 340/539.13 |
| 2017/0178352 A1 | 6/2017 | Harmsen et al. |
| 2018/0141490 A1 | 5/2018 | Sifuentes |

OTHER PUBLICATIONS

Rabinovitch A., "Live Video Chat Could Soon Replace The 911 Call," Huffington Post, https://www.huffingtonpost.com/entry/israel-video-chat-911-calls-us56e96587e4b065e2e3d7f3fa, Mar. 16, 2016, 2 pages.

* cited by examiner

ACTIVATING AN EMERGENCY MODE ASSOCIATED WITH A USER DEVICE

RELATED APPLICATIONS

This application is a continuation of U.S. patent application Ser. No. 16/284,814, filed Feb. 25, 2019 (now U.S. Pat. No. 10,771,949), which is a continuation of U.S. patent application Ser. No. 16/053,520, filed Aug. 2, 2018 (now U.S. Pat. No. 10,271,196), which are incorporated herein by reference.

BACKGROUND

An emergency service may be contacted by dialing an emergency telephone number, such as 9-1-1. In some cases, dialing an emergency telephone number may connect an individual with an emergency dispatch center. The emergency dispatch center may coordinate deployment of emergency responders (e.g., police officers, fire fighters, emergency medical technicians (EMTs), and/or the like) to an emergency.

SUMMARY

According to some possible implementations, a method may include detecting, by a user device, an indication to activate an emergency mode associated with the user device. The emergency mode may be associated with gathering data related to an emergency. The method may include determining, by the user device, a manner in which to configure a set of components or a set of actions to perform based on the indication or a setting associated with the emergency mode after detecting the indication. The set of components may be associated with gathering the data. The method may include activating, by the user device, the emergency mode after determining the manner in which to configure the set of components or the set of actions to perform. The emergency mode may be activated by at least one of: configuring the set of components, or performing the set of actions. The method may include gathering, by the user device, the data utilizing the set of components after activating the emergency mode. The method may include dynamically: storing, by the user device, the data utilizing one or more memory resources of the user device after gathering the data, or providing, by the user device, the data to another device after gathering the data. The method may include determining, by the user device, to terminate the emergency mode after dynamically storing the data in the one or more memory resources or providing the data to the other device.

According to some possible implementations, a user device may include one or more memories; and one or more processors, communicatively coupled to the one or more memories, to detect an indication to activate an emergency mode associated with the user device. The emergency mode may be associated with gathering data related to an emergency. The one or more processors may determine a manner in which to configure the emergency mode based on the indication or a setting associated with the emergency mode after detecting the indication. The setting may include: a user-configured setting, or a default setting. The one or more processors may activate the emergency mode after determining the manner in which to configure the emergency mode. The emergency mode may be activated by at least one of: configuring a set of components associated with the user device, performing one or more actions associated with the emergency mode, or establishing a connection between the user device and another device associated with an emergency service. The one or more processors may gather the data utilizing the set of components after activating the emergency mode. The one or more processors may dynamically: store the data utilizing one or more memory resources of the user device after gathering the data, or provide the data to the other device after gathering the data. The one or more processors may determine to terminate the emergency mode after dynamically storing the data or providing the data.

According to some possible implementations, a non-transitory computer-readable medium may store one or more instructions that, when executed by one or more processors, cause the one or more processors to detect an indication to activate an emergency mode associated with a user device. The indication may be detected via an input component associated with the user device or a sensor associated with the user device. The emergency mode may be associated with at least one of: activating a set of components associated with the user device, or performing one or more actions. The one or more instructions, when executed by the one or more processors, may cause the one or more processors to determine a manner in which to configure the emergency mode based on the indication or a setting associated with the emergency mode after detecting the indication. The one or more instructions, when executed by the one or more processors, may cause the one or more processors to activate the emergency mode after determining the manner in which to configure the emergency mode. The one or more instructions, when executed by the one or more processors, may cause the one or more processors to establish a connection with another device associated with an emergency service after activating the emergency mode. The one or more instructions, when executed by the one or more processors, may cause the one or more processors to gather data utilizing the set of components after activating the emergency mode. The one or more instructions, when executed by the one or more processors, may cause the one or more processors to perform the one or more actions in association with gathering the data. The one or more instructions, when executed by the one or more processors may cause the one or more processors to dynamically: store the data utilizing one or more memory resources of the user device after gathering the data or performing the one or more actions, or provide the data to another device after gathering the data or performing the one or more actions.

DETAILED DESCRIPTION

Figure 1A:
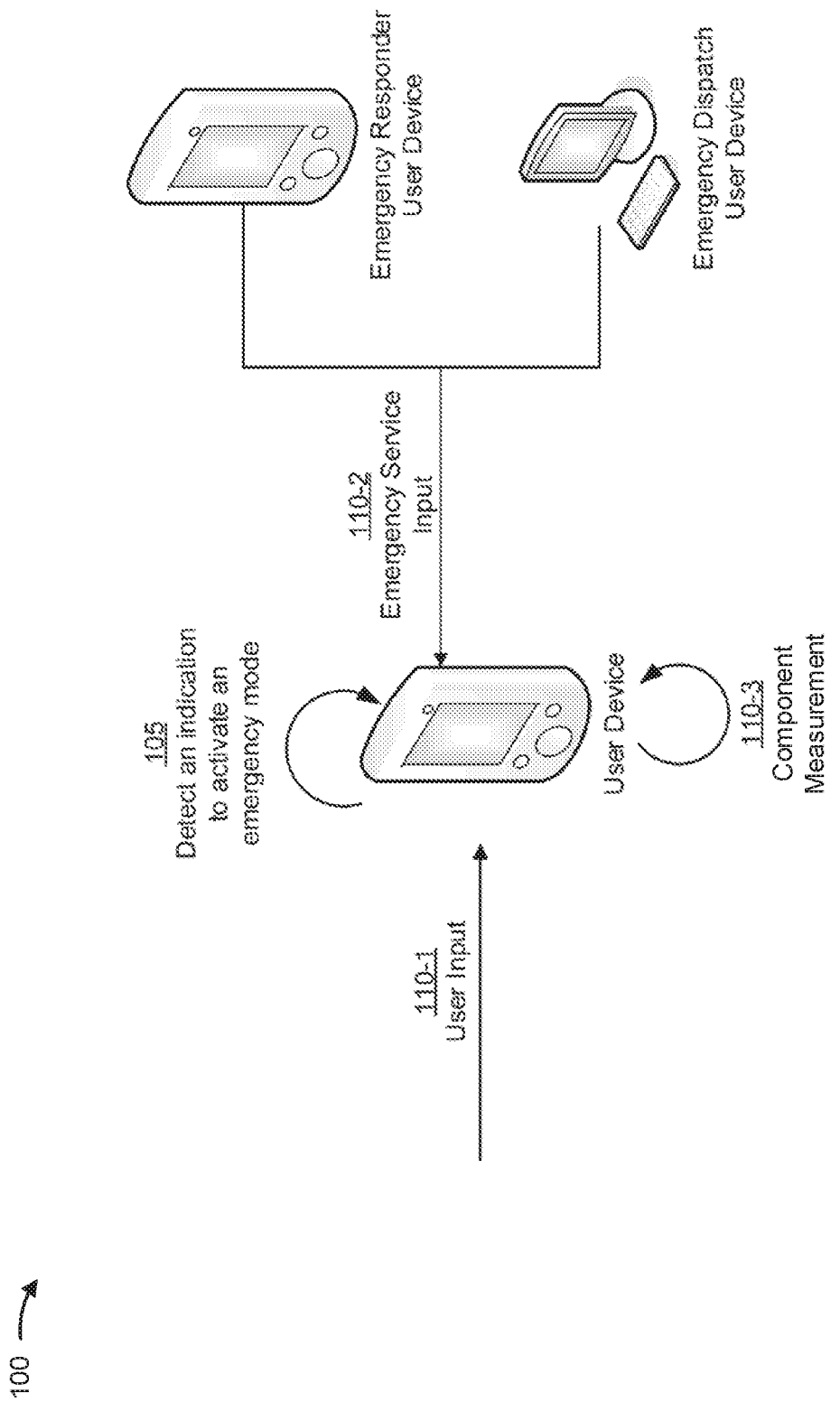
FIGS. 1A-1D are diagrams of an example implementation described herein.

The following detailed description of example implementations refers to the accompanying drawings. The same reference numbers in different drawings may identify the same or similar elements.

In an emergency, an individual may want to contact an emergency service (e.g., 9-1-1) so that emergency responders (e.g., police officers, fire fighters, emergency medical technicians (EMTs), and/or the like) can be deployed to the emergency. For example, the individual may want to dial an emergency telephone number via a user device to contact the emergency service during an emergency. In some cases, however, the individual may not be capable of accessing a user device to dial the emergency service. For example, the individual may not be capable of accessing the user device due to being injured, due the user device being out of reach of the individual, due to the presence of an assailant (or a possible assailant), and/or the like. Further, in some emergencies, an individual may want to use a user device to gather information related to the emergency (e.g., to provide the emergency responders with information related to the emergency upon arrival to a location of the emergency, to document the emergency, and/or the like). However, the individual may not be capable of accessing the user device to use the user device to gather information for similar reasons as described above.

Some implementations described herein provide a user device that is capable of activating an emergency mode based on detecting on one or more indications to activate the emergency mode. When operating in the emergency mode, the user device may perform various actions and/or gather various types of data based on the one or more indications that cause the user device to activate the emergency mode. For example, different indications may cause the user device to automatically and/or discretely contact an emergency service, to gather video and/or audio data related to an emergency, and/or the like. In this way, the user device facilitates contacting of an emergency service and/or gathering of information during an emergency in situations where an individual would not otherwise be capable of accessing the user device for these purposes.

This facilitates a faster response by emergency responders to an emergency by facilitating automatic contacting of an emergency service. In addition, this facilitates a more accurate response by emergency responders to an emergency via gathering of data related to an emergency prior to arrival of emergency responders at a location of an emergency and providing that data to the emergency responders. Further, this improves a safety of emergency responders via gathering of information related to an emergency prior to arrival of the emergency responders at a location of an emergency. Further, this conserves computing resources related to contacting an emergency service by reducing or eliminating a need for manual use of a user device to contact the emergency service, by simplifying a manner in which the user device can be accessed to contact the emergency service, and/or the like.

FIGS. 1A-1D are diagrams of an example implementation 100 described herein. Implementation 100 may include a user device, an emergency responder user device, an emergency dispatch user device, and a server device (not shown in FIG. 1A). Although described with regard to a single instance of these devices, in reality, there may be hundreds, thousands, or more of these devices performing the implementations described herein. For implementation 100, assume that the user device is associated with an individual and is capable of activating an emergency mode (described elsewhere herein). Additionally, or alternatively, assume that the emergency responder user device is associated with an emergency responder and that the emergency dispatch user device is associated with an emergency dispatch center. In some implementations, the server device may be associated with an emergency service and/or a third-party service and is described elsewhere herein.

As shown in FIG. 1A, and by reference number 105, the user device may detect an indication to activate an emergency mode. For example, the user device may detect the indication based monitoring for various indications. In some implementations, the user device may detect the indication based on having a particular application installed on the user device (e.g., an application that facilitates activation of the emergency mode). For example, the application may perform one or more background operations on the user device that monitor for various indications. Additionally, or alternatively, the user device may detect the indication based on a user of the user device configuring a setting of the user device to monitor for various indications. In some implementations, and as described elsewhere herein, the indication may include input to the user device, a measurement by a component associated with the user device (referred to as a "component measurement" elsewhere herein), and/or the like.

In some implementations, the user device may detect a single indication when detecting the indication (e.g., input of a single indication, a single component measurement, and/or the like). Additionally, or alternatively, the user device may detect multiple indications when detecting the indication. For example, the user device may detect a particular combination of indications that indicates that the user device is to activate the emergency mode, may detect multiple indications in a particular order that indicates that the user device is to activate the emergency mode, may detect a threshold quantity of indications within a threshold amount of time that indicates that the user device is to activate the emergency mode, and/or the like.

In some implementations, the user device may determine a likelihood that the indication is associated with an emergency (e.g., to reduce false positive detections). For example, the user device may determine whether the indication is detected multiple times within a threshold amount of time (e.g., which may indicate a higher likelihood that the indication is associated with an emergency). Additionally, or alternatively, and as another example, when the indication is user input, the user device may determine whether the indication was detected in association with other input that does not provide the user device with an indication to activate the emergency mode. For example, a verbal command received by the user device in association with a sentence may reduce a likelihood that the verbal command is intended to activate the emergency mode, an access code associated with an emergency mode input into a lock screen followed, within a threshold amount of time, by another access code to unlock the user device may be associated with a higher likelihood that the access code was not intended to activate the emergency mode, and/or the like.

In some implementations, the user device may store and/or use a model that has been trained to determine that a combination of indicators indicate that an emergency is occurring. For example, the model may have been trained on a training set of data that includes information identifying various combinations of indicators and information identifying whether the various combinations of indicators indicate that an emergency is occurring. In some implementations, the model may be trained based on recording various indicators when a user of the user device activates an emergency mode manually, based on being trained on sets of data from other user devices that identify values for various indicators when users of the other user devices activated an emergency mode, and/or the like. In some implementations, the model may be updated and/or tailored for a user of the user device based on whether a user deactivates an emergency mode or otherwise prevents the user device from activating the emergency mode when the model would otherwise indicate that the emergency mode is to be activated (e.g., by canceling activation of the emergency mode via selection of a user interface element associated with a user interface, by dismissing a notification provided for display via a display associated with the user device via user interaction with a user interface, and/or the like).

In some implementations, the emergency mode may be associated with gathering data related to an emergency, performing a set of actions during an emergency, and/or the like. For example, when operating in the emergency mode, the user device may operate in a manner that is different from a normal operation of the user device by activating and/or deactivating various components to gather the data, by performing the set of actions, and/or the like.

As further shown in FIG. 1A, and by reference numbers 110-1 through 110-3, the indication may include user input, emergency service input, and/or a component measurement. In some implementations, the user input may include a term and/or phrase input by an individual into a microphone of the user device (e.g., a verbal command), a particular access code input to a lock screen provided for display via a display associated with the user device, a particular pattern input (e.g., drawn) on the lock screen, selection of a particular button, or combination of buttons, associated with the user device (e.g., a physical button associated with the user device and/or a virtual button associated with a user interface provided for display via a display associated with the user device), a body gesture input to a camera associated with the user device, and/or the like. In some implementations, a user of the user device may input the user input to an input component associated with the user device and the user device may detect the indication based on the receiving the user input via the input component.

In some implementations, the indication may include emergency service input from an emergency service (e.g., from the emergency responder user device and/or the emergency dispatch user device associated with the emergency service). In some implementations, the emergency service input may include a set of instructions to cause the user device to activate the emergency mode, a request from the emergency responder user device and/or the emergency dispatch user device to activate the emergency mode, and/or the like. In some implementations, the user device may receive the emergency service input based on having contacted the emergency service, based on being located at a location identified as a location of an emergency, and/or the like. For example, a user of the user device may have registered for a service that allows an emergency service to provide the emergency service input to the user device, may have installed an application that allows the emergency service to provide the emergency service input to the user device, and/or the like.

In some implementations, and continuing with the previous example, by registering for the service, installing the application, and/or the like, the user of the user device may opt-in to allowing the emergency service to provide the emergency service input to the user device when the user device is used to contact the emergency service, may opt-in to providing location data that identifies a location of the user device to the emergency service so that the emergency service can determine whether the user device is at a location of an emergency (even if the individual associated with the user device is not the person experiencing the emergency), and/or the like. In this way, devices associated with the emergency service can cause the user device to activate an emergency mode remotely, can remotely and accurately warn individuals about an emergency, and/or the like, which may improve safety of individuals during an emergency, may facilitate additional data gathering by user devices associated with individuals at the same location as an emergency, and/or the like.

In some implementations, the indication may include a component measurement. For example, a component measurement may include a measurement gathered by a component associated with the user device (e.g., an accelerometer (e.g., to detect a fall and/or a crash), a global positioning system (GPS) component (e.g., to detect a location of the user device in an area designated as an area of an emergency), a temperature measurement component (e.g., to detect a fire), a gas detector (e.g., to detect a gas leak), and/or the like). In some implementations, and as a specific example, the component measurement may include an acceleration and/or a deceleration measured by an accelerometer associated with the user device. For example, a threshold acceleration and/or a threshold deceleration may indicate that an individual has experienced an event, such as a vehicle crash, a kidnapping, or a fall, that could cause bodily injury. Additionally, or alternatively, and as another specific example, the component measurement may include location data measured by a global positioning system (GPS) component of the user device. For example, the user device may have received information from an emergency service that identifies a location of an emergency, and the user device may determine that the user device is at the same location, or is within a threshold proximity, of the location of the emergency, and may detect the indication based on being located at the same location, or within the threshold proximity, of the location of the emergency.

Figure 1B:
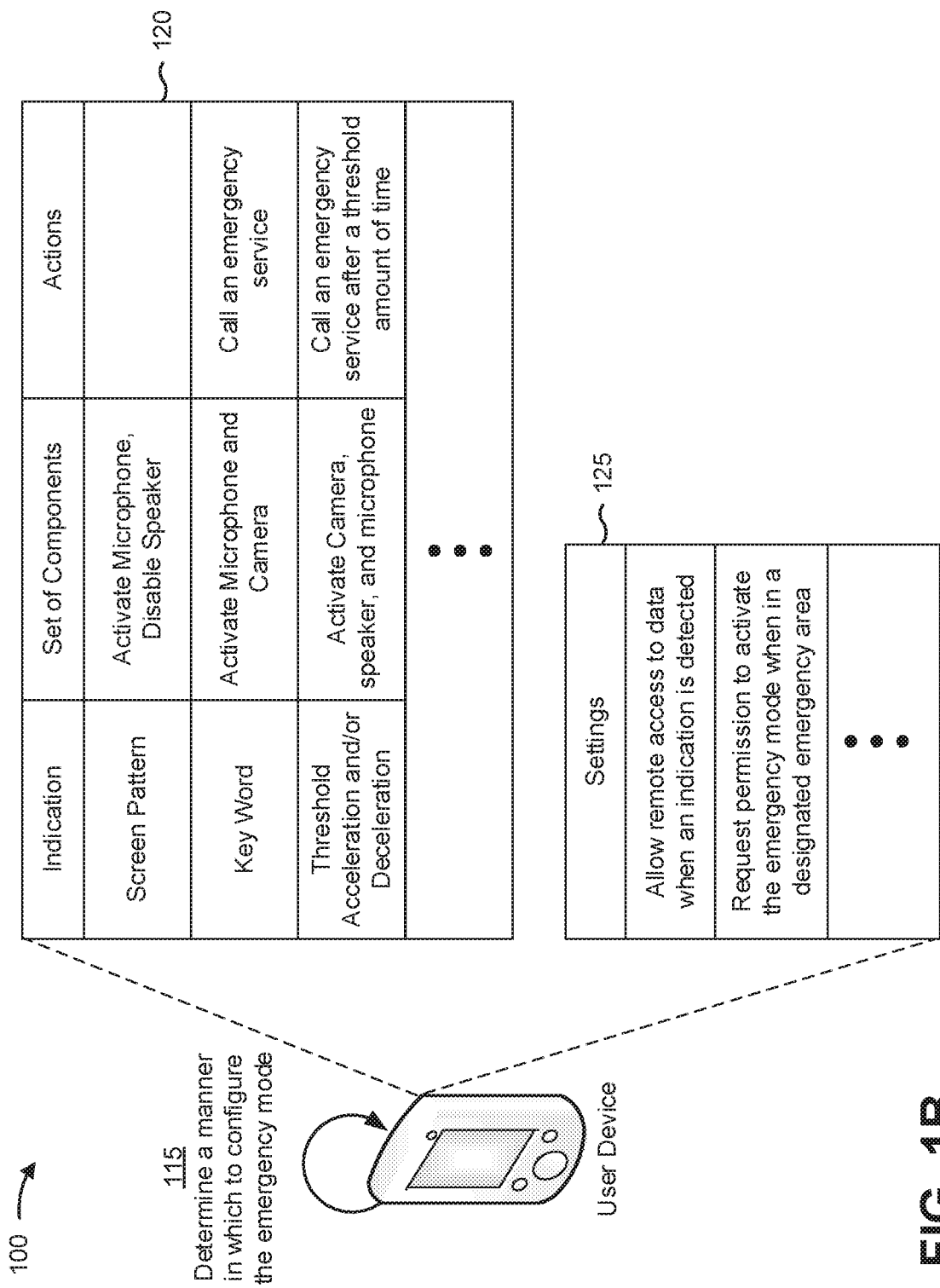

Turning to FIG. 1B, and as shown by reference number 115, the user device may determine a manner in which to configure the emergency mode. For example, the user device may determine particular components associated with the user device to activate or to deactivate, may determine a set of actions to perform when operating in the emergency mode, and/or the like. In some implementations, the set of components that the user device may activate or deactivate in association with activating the emergency mode may include a speaker, a microphone, a display, a light, a ringer, a vibration motor, a GPS component, and/or the like associated with the user device. In some implementations, the set of actions that the user device may perform in association with activating the emergency mode may include placing a telephone call and/or a video call to an emergency service, sending a pre-configured text message to an emergency service and/or a set of contacts associated with the user device, gathering data (e.g., voice data, audio data, accelerometer data, location data, and/or the like), storing the data in one or more memory resources of the user device, providing the data to another device (e.g., the emergency responder user device, the emergency dispatch user device, and/or the server device), such as via a secure connection or as a broadcast transmission, and/or the like.

In some implementations, and as shown by reference number 120, the user device may determine the manner in which to configure the emergency mode based on the indication that the user device detected. For example, different indications may be associated with different manners in which to configure the emergency mode (e.g., different sets of components to activate or deactivate, different actions to perform, and/or the like). As a specific example, if the user device detects a threshold acceleration or deceleration via an accelerometer associated with the user device, the user device may determine to activate a camera associated with the user device, to activate a speaker associated with the user device, and/or to activate a microphone associated with the user device. In addition, the user device may determine to call an emergency service after a threshold amount of time following the detected acceleration or deceleration (e.g., a threshold amount of time without detecting additional accelerations and/or decelerations). In this case, the threshold acceleration or deceleration followed by the threshold amount of time without detecting additional accelerations and/or decelerations may indicate that the user of the user device experienced a vehicle crash or a fall and may be incapacitated in some way.

In some implementations, the user device may perform a lookup to determine a manner in which to configure the emergency mode. For example, the user device may perform a lookup of information identifying the indication that the user device detected in a data structure that stores information identifying a mapping between various indications and sets of components and/or actions to be performed. In some implementations, a mapping between different indications and different manners in which to configure the emergency mode may be pre-programmed into the user device (e.g., pre-programmed in association with an application associated with the emergency mode). Additionally, or alternatively, the mapping between the different indications and the different manners in which to configure the emergency mode may be user configured (e.g., the user may program the mapping via a menu selection, during an initial setup process associated with the emergency mode, and/or the like).

In some implementations, and as shown by reference number 125, the user device may determine the manner in which to configure the emergency mode based on a setting associated with the emergency mode. For example, the emergency mode may be associated with various settings that can be used to control the manner in which the emergency mode is configured, to control the manner in which the user device operates when operating in the emergency mode, and/or the like. As specific examples, various settings associated with the emergency mode may cause the user device, when operating in the emergency mode, to allow remote access to data that the user device gathers when operating in the emergency mode, to request permission via a display associated with the user device to activate the emergency mode when in a location designated as being associated with an emergency, and/or the like.

In some implementations, a setting may be associated with an indication. For example, particular settings may apply when particular indications are detected by the user device. Additionally, or alternatively, a setting may be a default setting associated with the emergency mode. Additionally, or alternatively, a setting may be a user configured setting associated with the emergency mode.

Figure 1C:
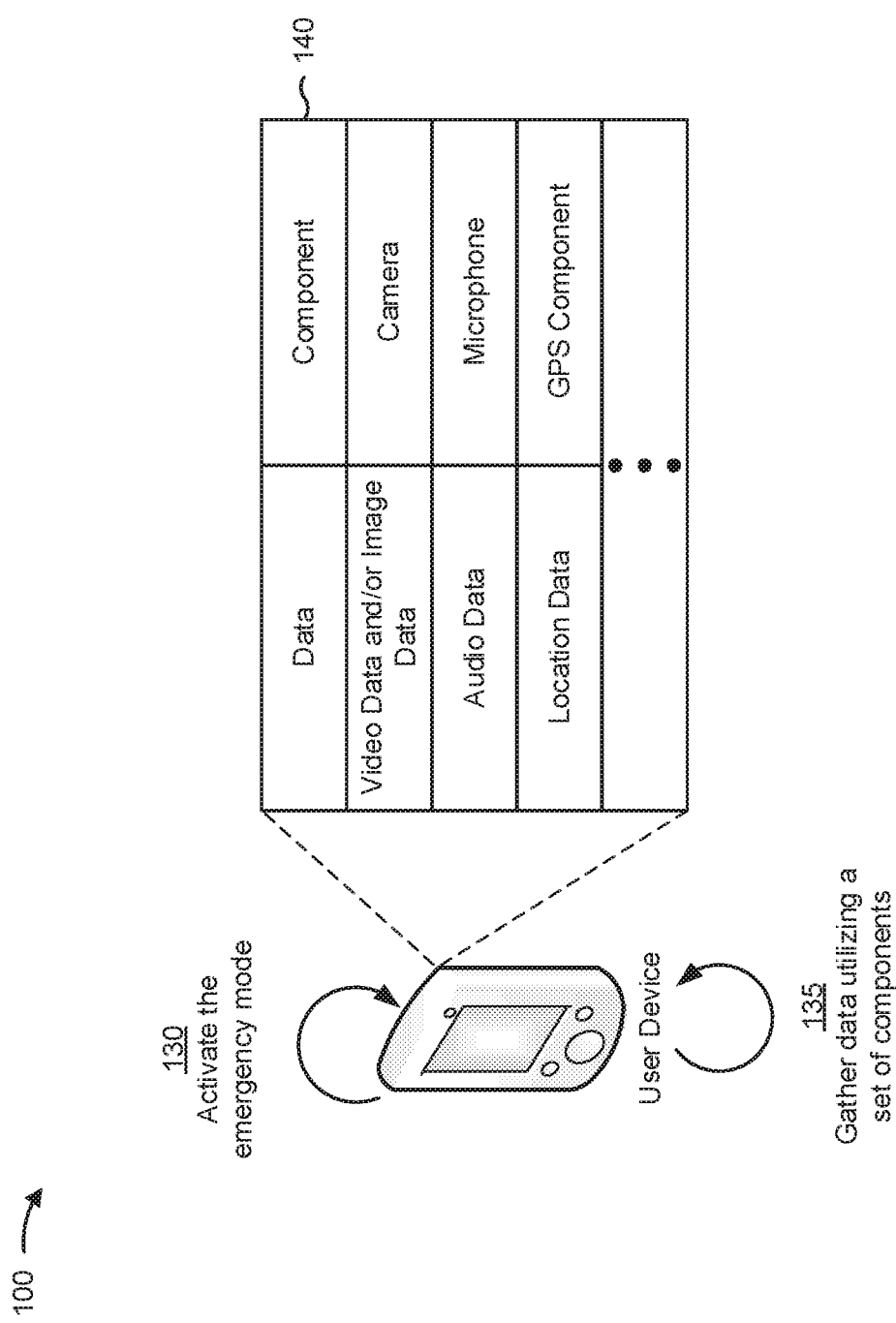

Turning to FIG. 1C, and as shown by reference number 130, the user device may activate the emergency mode. For example, the user device may activate or deactivate various components associated with the user device (e.g., based on the indication that the user device detected), may perform a set of actions associated with the emergency mode (e.g., based on the indication that the user device detected), may configure to operate in a particular manner based on a setting, and/or the like.

As shown by reference number 135, the user device may gather data utilizing a set of components. For example, the user device may gather data utilizing the set of components that the user device activated in association with activating the emergency mode. In some implementations, the user device may gather the data continuously, periodically, according to a schedule, until the user device receives an indication to terminate the emergency mode, for a threshold amount of time, until the user device receives an indication from the emergency responder user device and/or the emergency dispatch user device that an emergency responder has arrived at a location of an emergency, after a location is no longer designated as a location of an emergency, and/or the like.

As show by reference number 140, the user device may utilize different components to gather different types of data. For example, the user device may use a camera to gather video data and/or image data, may use a microphone to gather audio data, may use a GPS component to gather location data, and/or the like. In some implementations, the data that the user device gathers may be based on the manner in which the user device configured the emergency mode (e.g., based on the set of components that the user device activated or deactivated).

Figure 1D:
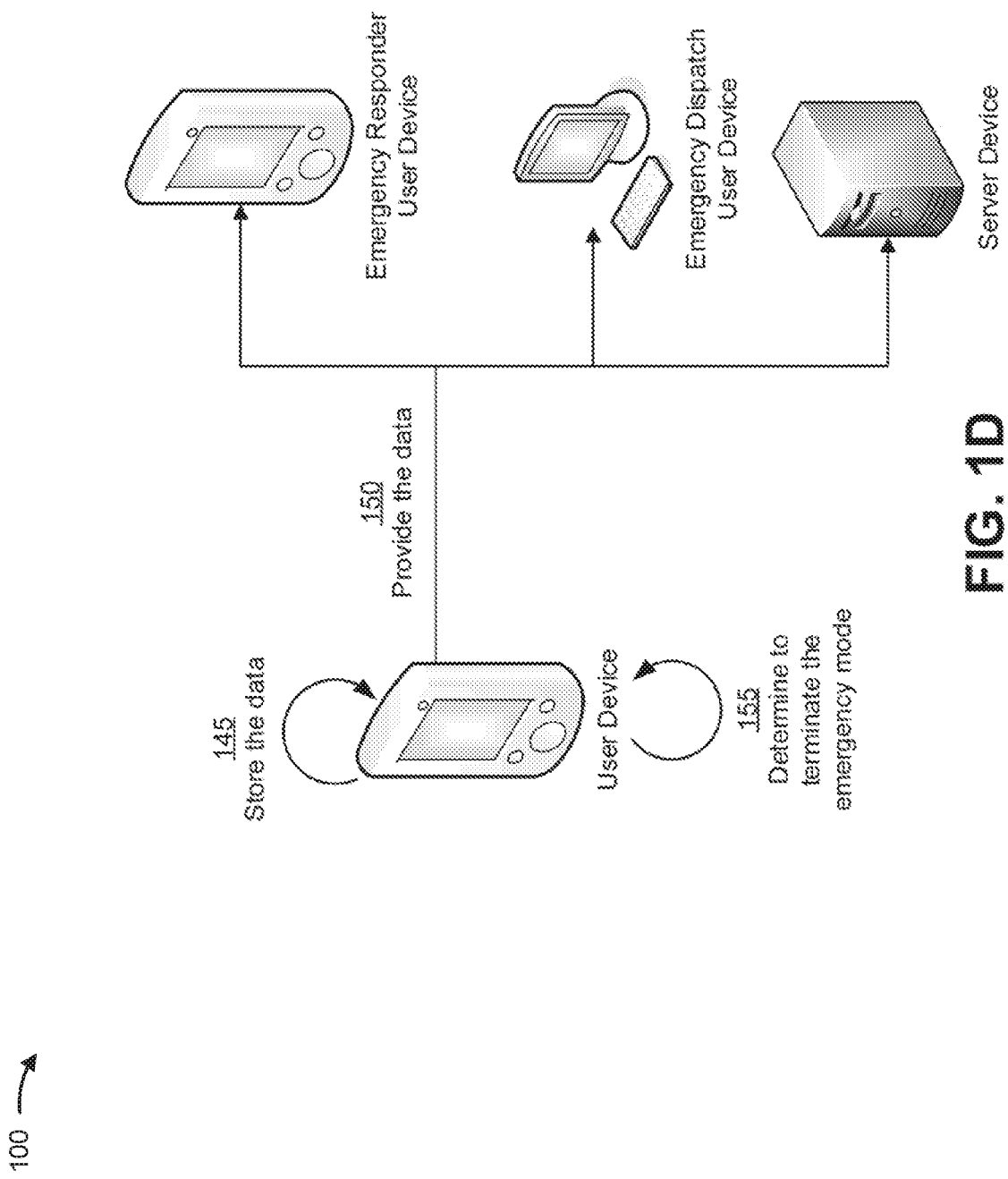

Turning to FIG. 1D, and as shown by reference number 145, the user device may store the data. For example, the user device may store the data in one or more memory resources associated with the user device. In some implementations, the user device may provide another device, such as the emergency responder user device and/or the emergency dispatch user device, with access to the data stored in the one or more memory resources via a secure connection between the user device and the other device. For example, the user device and the other device may establish a connection with each other based on the user device activating the emergency mode (e.g., based on the user device requesting to establish the connection based on activating the emergency mode and/or based on the other device receiving an indication that the user device has activated the emergency mode and requesting to establish the connection), and the other device may be capable of accessing the data via the connection with the user device. In some cases, the data may be accessible in real-time or near real-time (e.g., as the data is gathered and/or stored), at a later time after the data has been gathered and/or stored, and/or the like.

As shown by reference number 150, the user device may provide the data to one or more other devices. For example, the user device may provide the data to the emergency responder user device, to the emergency dispatch user device, to the server device, and/or the like. In some implementations, the user device may provide the data to the one or more other devices in real time or near real-time (e.g., as the data is being gathered), at a later time after the data is gathered (e.g., from the one or more memory resources of the user device), periodically, automatically after gathering and/or storing the data, according to a schedule, and/or the like. In some implementations, the user device may provide the data via a secure connection between the user device and the one or more other devices (e.g., after establishing the secure connection in a manner similar to that described above).

In some implementations, the one or more other devices may use the data from the user device in various manners.

For example, the one or more other devices may provide video data for display, may output audio data via a speaker, may generate a set of directions to a location identified by the location data (e.g., utilizing a navigation application) and may provide the set of directions for display, and/or the like. Additionally, or alternatively, and as another example, the one or more other devices may dispatch an emergency responder to a location of an emergency based on receiving the data from the user device and/or detecting that the user device has activated the emergency mode (e.g., the emergency dispatch user device may send a message to the emergency responder user device to dispatch an emergency responder).

In some implementations, the user device may dynamically store the data and/or provide the data. For example, the user device may determine whether the user device is connected to another device, whether a strength of a signal received by the user device satisfies a threshold, and/or the like and may dynamically store and/or provide the data based on whether the user device is connected to the other device, whether the strength of the signal satisfies the threshold, and/or the like. In some implementations, if the user device determines that the user device is not connected to another device, that the strength of the signal does not satisfy the threshold, and/or the like, then the user device may store the data and may not provide the data.

This conserves computing resources of the user device in scenarios where the user device may not be capable of providing the data to another device due to connection-related issues by preventing the user device from providing the data. In some implementations, if the user device determines that the user device is connected to another device, that the strength of the signal satisfies the threshold, and/or the like, then the user device may provide the data and/or may store the data. This conserves memory resources of the user device by reducing and/or eliminating a need to store the data in scenarios when the user device can provide the data to another device.

In some implementations, when the user device has activated the emergency mode, the user device, the emergency responder user device, and/or the emergency dispatch user device may send a notification to other user devices (e.g., located within a threshold proximity of the user device that activated the emergency mode), as described in more detail elsewhere herein. For example, the user device may broadcast the notification at a threshold power level so that the notification can be transmitted to any user devices located within the threshold proximity. Additionally, or alternatively, and as another example, the emergency responder user device and/or the emergency dispatch user device may send a notification to other user devices located with a threshold proximity of the user device based on location information that identifies a location of the other user devices relative to the user device. In some implementations, the notification may cause the other user devices to activate an emergency mode.

As shown by reference number 155, the user device may determine to terminate the emergency mode. In some implementations, the user device may determine to terminate the emergency mode based on receiving an indication to terminate the emergency mode. For example, a particular indication, similar to the indication to activate the emergency mode, may cause the user device to terminate the emergency mode, and may cause the user device to reconfigure activated or deactivated components to a default state, may stop performing an action associated with the emergency mode, and/or the like to terminate the emergency mode.

Additionally, or alternatively, the user device may determine to terminate the emergency mode based on a threshold amount of time elapsing from when the user device initiated the emergency mode (e.g., the user device may initiate a timer when activating the emergency mode and may terminate the emergency mode when the timer expires). Additionally, or alternatively, the user device may terminate the emergency mode based on receiving a set of instructions from another device to terminate the emergency mode. For example, if the user device and the emergency responder user device and/or the emergency dispatch user device are connected, then the emergency responder user device and/or the emergency dispatch user device may provide the set of instructions to the user device via input to the emergency responder user device and/or the emergency dispatch user device after an emergency responder arrives at a location of an emergency, after the emergency responder has located an individual associated with the user device, after the emergency responder has resolved the emergency, and/or the like. Additionally, or alternatively, the user device may determine to terminate the emergency mode based on an individual associated with the user device moving the user device from a location identified as being associated with an emergency (e.g., the user device may have received information that identifies a location of an emergency associated with another individual and may determine to terminate the emergency mode when the user device is no longer at that location or within a threshold proximity of that location).

In some implementations, the user device may provide a notification for display to indicate that the emergency mode has been terminated. Additionally, or alternatively, the user device may output a light, a sound, a vibration, and/or the like to indicate that the emergency mode has been terminated. Additionally, or alternatively, the user device may notify another device that the emergency mode has been terminated. For example, the user device may provide a notification for display to the emergency responder user device and/or to the emergency dispatch user device to indicate that the emergency mode has been terminated.

In this way, a user device may activate an emergency mode in an efficient manner. This facilitates access to emergency services and/or facilitates generation of data related to an emergency in situations when a user of the user device may not be capable of accessing the user device for such purposes. In addition, this provides a way for emergency responders to receive accurate data related to an emergency in real-time or near real-time, thereby increasing an efficiency of providing emergency services during an emergency, improving a safety of emergency responders during an emergency, improving emergency services that an individual receives during an emergency, and/or the like. Further, this provides a tool that can be used during an emergency to aid emergency responders, to aid an individual experiencing an emergency, and/or the like in a manner not previous possible.

As indicated above, FIGS. 1A-1D are provided merely as an example. Other examples are possible and may differ from what was described with regard to FIGS. 1A-1D.

Figure 2A:
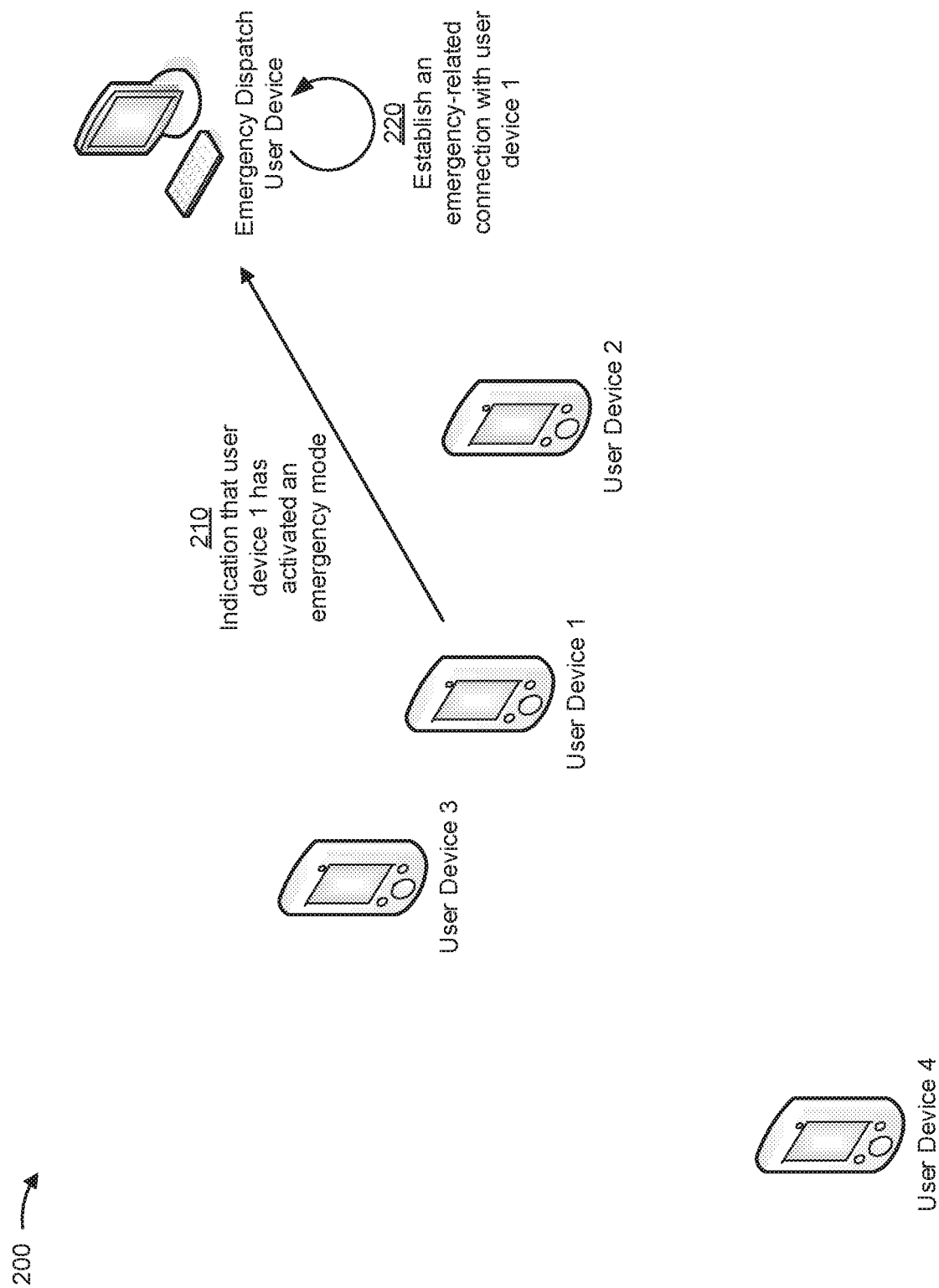
FIGS. 2A-2C are diagrams of another example implementation described herein.
Figure 2B:
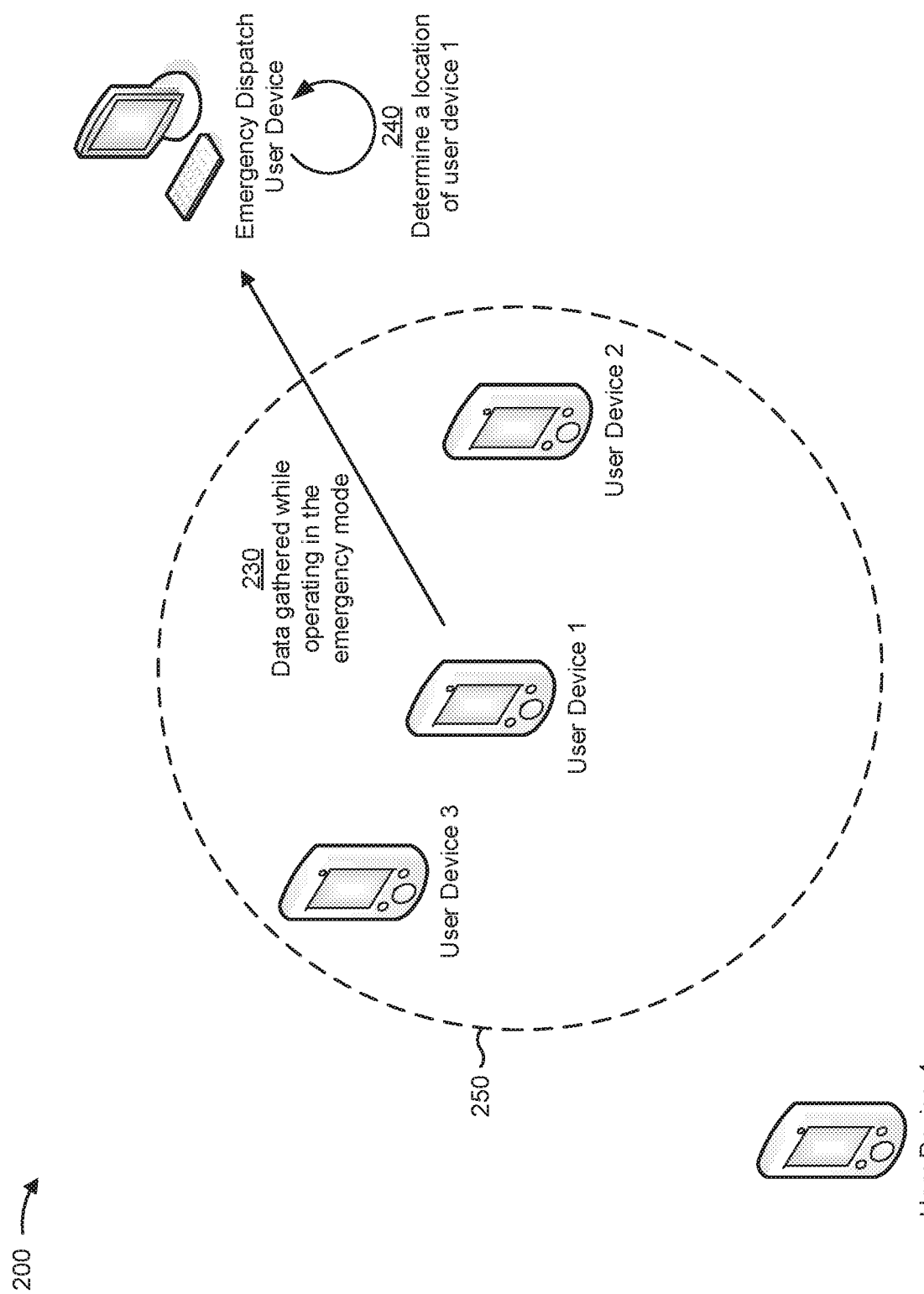
Figure 2C:
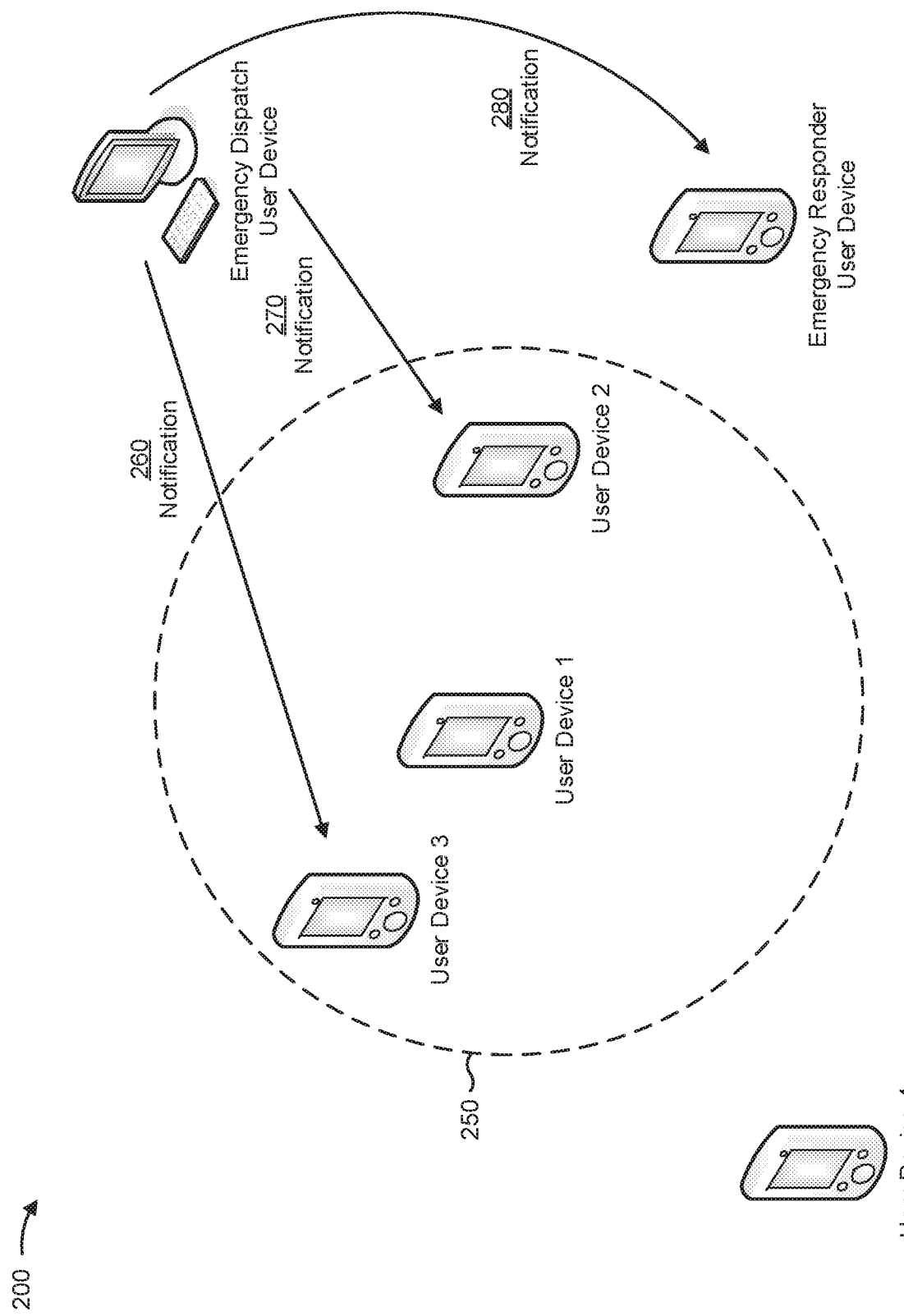

FIGS. 2A-2C are diagrams of another example implementation 200 described herein. As shown in FIG. 2A, implementation 200 includes a set of user devices (e.g., user devices 1 through 4), an emergency dispatch user device, and an emergency responder user device (not shown in FIG. 2A). Although described separately, the implementations described with regard to FIGS. 2A-2C and the implementations described with regard to FIGS. 1A-1D may be combined with each other.

As shown by reference number 210, the user device 1 may provide, to the emergency dispatch user device, an indication that the user device 1 has activated an emergency mode. For example, the user device 1 may have detected an indication to activate the emergency mode, may have activated the emergency mode after detecting the emergency mode, and may be providing the indication after activating the emergency mode. In some implementations, the user device 1 may provide the indication in a manner that is the same as or similar to that described elsewhere herein.

As shown by reference number 220, the emergency dispatch user device may establish an emergency-related connection with the user device 1. For example, the emergency dispatch user device may establish a dedicated connection, a secure connection, and/or the like with the user device 1. Continuing with the previous example, the emergency-related connection may be used to communicate with the user device 1 during an emergency, to access data stored on the user device 1 (e.g., data that the user device 1 gathered), to receive data gathered by the user device 1, and/or the like. In some implementations, the user device 1 and the emergency dispatch user device may establish a connection in a manner that is the same as or similar to that described elsewhere herein.

Turning to FIG. 2B, and as shown by reference number 230, the user device 1 may provide, to the emergency dispatch user device, data gathered while operating in the emergency mode. In some implementations, the user device 1 may provide the data in a manner that is the same as or similar to that described elsewhere herein. As shown by reference number 240, the emergency dispatch user device may determine a location of the user device 1 based on the data (e.g., based on location data included in the data). For example, the emergency dispatch user device may plot the location data on a digital map to determine the location of the user device 1. In some implementations, the emergency dispatch user device may track the location of the user device 1 as the user device 1 is moved about while operating in the emergency mode.

As shown by reference number 250, the emergency dispatch user device may determine a threshold proximity around the location of the user device 1 to designate as a location associated with an emergency. For example, the emergency dispatch user device may determine a threshold distance around the location of the user device 1 to designate as the location associated with the emergency using a digital map. In some implementations, the emergency dispatch user device may determine the threshold proximity as the user device 1 is moved about.

In some implementations, the threshold proximity may be a default proximity. For example, the same threshold proximity may be used regardless of the user device that has activated an emergency mode. Additionally, or alternatively, the threshold proximity may be configured by a user of the emergency dispatch user device. For example, the user of the emergency dispatch user device may input information that identifies the threshold proximity around the location of the user device 1. Additionally, or alternatively, the threshold proximity may be based on a severity of an emergency. For example, different manners in which to configure the emergency mode and/or different indications that cause the user device 1 to activate the emergency mode may be associated with different severities. In this case, when the user device 1 activates the emergency mode, the user device 1 may provide, to the emergency dispatch user device, information that identifies the severity of the emergency (e.g., based on performing a lookup of the indication in a data structure that stores information identifying various indications and respective severities), and the emergency dispatch user device may determine the threshold proximity based on the information that identifies the severity (e.g., different severities may be associated with different threshold proximities). In some implementations, the different severities may be user configured, may be default configurations, and/or the like.

In some implementations, the emergency dispatch user device may determine a set of user devices within the threshold proximity of the user device 1. For example, the emergency dispatch user device may determine the set of user devices based on location data that identifies a respective location of the set of user devices. In some implementations, the emergency dispatch user device may receive location data for thousands, millions, or more user devices in a continuous manner, in real-time or near real-time, and/or the like, even when the user devices are not experiencing an emergency. For example, the emergency dispatch user device may receive the location data based on users of the user devices having opted-in to providing the location data, based on the user devices having a particular application associated with an emergency service and/or an emergency mode installed, and/or the like. In some implementations, the emergency dispatch user device may process the location data after receiving an indication that one of the user devices has activated an emergency mode (e.g., after receiving an indication that the user device 1 has activated the emergency mode). For example, the emergency dispatch user device may process the location data using a digital map to identify the set of user devices that is within the threshold proximity of the user device 1. In this case, assume that the emergency dispatch user device has identified user device 2 and user device 3 as being within the threshold proximity of the user device 1.

Turning to FIG. 2C, and as shown by reference numbers 260 and 270, the emergency dispatch user device may provide a notification to the set of user devices within the threshold proximity of the user device 1. For example, the emergency dispatch user device may provide a notification to the user device 3 (shown by reference number 260) and to the user device 2 (shown by reference number 270) for display via respective displays associated with the user device 2 and the user device 3.

In some implementations, the notification may include information identifying that the set of user devices is within the threshold proximity of the user device 1 that has activated the emergency mode. Additionally, or alternatively, the notification may include a set of instructions that cause the set of user devices to activate an emergency mode so that the set of user devices can be used to gather data that may be related to the emergency. For example, the set of instructions may cause a set of components to be configured, may cause a set of actions to be performed, may override settings configured on the user device, and/or the like. Additionally, or alternatively, the notification may include a request for a user of the user device to activate an emergency mode. In some implementations, the emergency dispatch user device may send additional notifications to new user devices that become located within the threshold proximity of the user device 1 (e.g., based on the new user devices being moved within the threshold proximity, based on the new user devices being powered on, based on the user device 1 moving to a different location, and/or the like).

As shown by reference number 280, the emergency dispatch user device may provide a notification to the emergency responder user device. For example, the notification may include information that identifies that the user device 1 has activated the emergency mode, may include location data for the user device 1 so that the emergency responder user device can determine a set of directions to the user device 1, may include other data gathered by the user device 1 while operating in the emergency mode (e.g., for output via an output component associated with the emergency responder user device), and/or the like.

In some implementations, the emergency dispatch user device may provide another notification to the set of user devices to indicate that an emergency has been resolved, to terminate the emergency mode activated on the set of user devices, and/or the like. For example, the emergency dispatch user device may provide the other emergency notification after the emergency has been resolved, after the set of user devices is no longer within the threshold proximity of the user device 1, and/or the like.

As indicated above, FIGS. 2A-2C are provided merely as an example. Other examples are possible and may differ from what was described with regard to FIGS. 2A-2C.

Figure 3:
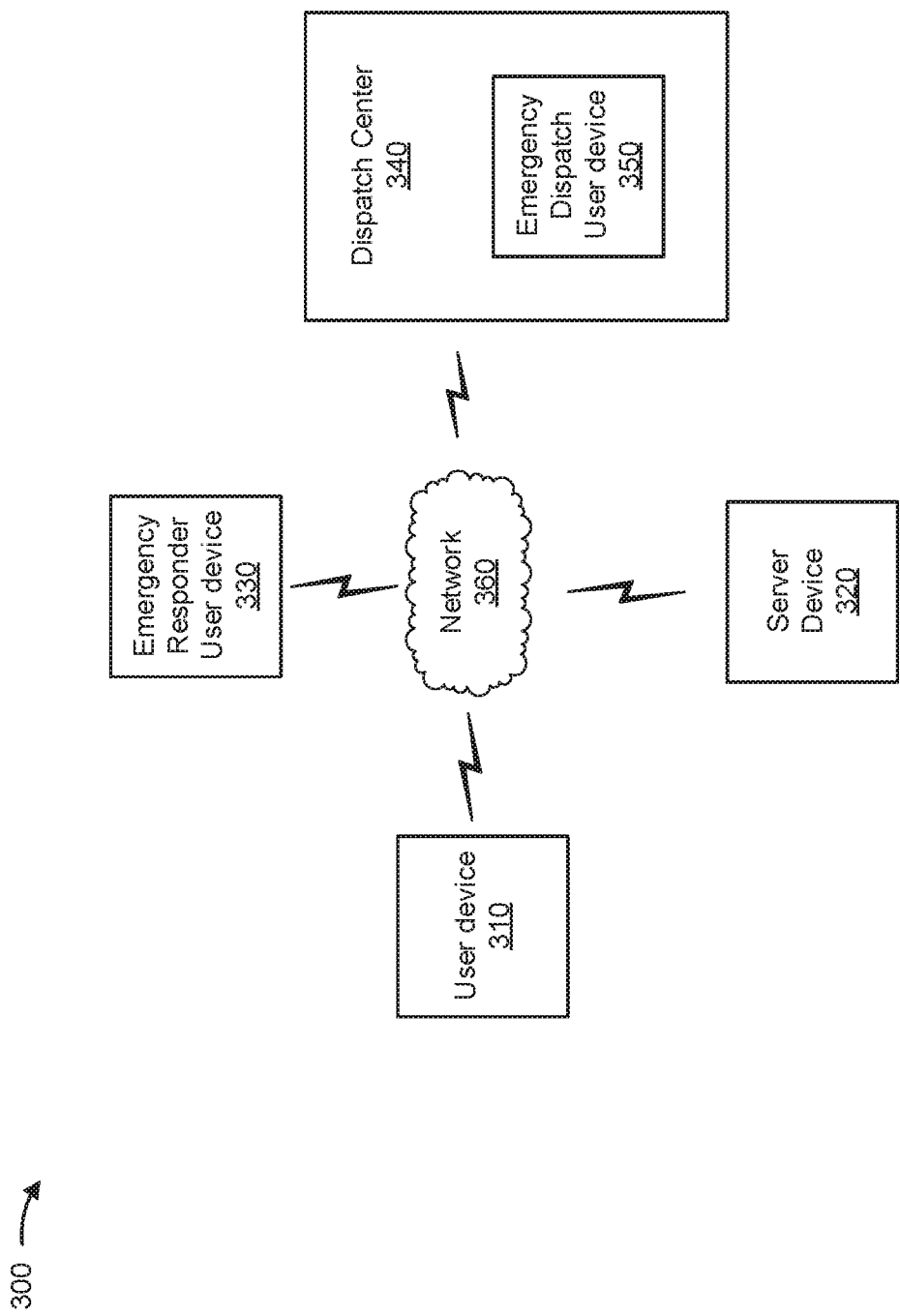
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a user device 310, a server device 320, an emergency responder user device 330, a dispatch center 340 that includes an emergency dispatch user device 350, and a network 360. Devices of environment 300 may interconnect via wired connections, wireless connections, or a combination of wired and wireless connections.

User device 310 includes one or more devices capable of receiving, providing, storing, processing, and/or generating information related to an emergency mode. For example, user device 310 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. In some implementations, user device 310 may detect an indication to activate an emergency mode and/or may provide information related to activating the emergency mode to emergency responder user device 330 and/or emergency dispatch user device 350, as described elsewhere herein.

Server device 320 includes one or more devices capable of receiving, generating storing, processing, and/or providing information associated with an emergency mode. For example, server device 320 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 320 may include a communication interface that allows server device 320 to receive information from and/or transmit information to other devices in environment 300. In some implementations, server device 320 may be a physical device implemented within a housing, such as a chassis. In some implementations, server device 320 may be a virtual device implemented by one or more computer devices of a cloud computing environment or a data center. In some implementations, server device 320 may receive and/or store data gathered by user device 310 while operating in an emergency mode, as described elsewhere herein.

Emergency responder user device 330 includes one or more devices capable of receiving, providing, storing, processing, and/or generating information related to an emergency mode. For example, emergency responder user device 330 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. In some implementations, emergency responder user device 330 may be associated with an emergency responder, as described elsewhere herein. In some implementations, emergency responder user device 330 may receive data gathered by user device 310 when user device 310 is operating in an emergency mode, as described elsewhere herein.

Dispatch center 340 includes a dispatch center, an emergency dispatch center, a call center, and/or the like. In some implementations, dispatch center 340 may include a physical location (e.g., a building) that houses a set of emergency dispatch user devices 350 used to receive calls to an emergency service and/or to dispatch emergency responders to an emergency. In some implementations, dispatch center 340 may include a single physical location or multiple physical locations where devices associated with the multiple physical locations are connected via network 360.

Emergency dispatch user device 350 includes one or more devices capable of receiving, providing, storing, processing, and/or generating information related to an emergency mode. For example, emergency dispatch user device 350 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. In some implementations, emergency dispatch user device 350 may be associated with dispatch center 340, as described elsewhere herein. In some implementations, emergency dispatch user device 350 may receive an indication that user device 310 has activated an emergency mode, and may send a message to emergency responder user device 330 to dispatch an emergency responder to an emergency, as described elsewhere herein.

Network 360 includes one or more wired and/or wireless networks. For example, network 360 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
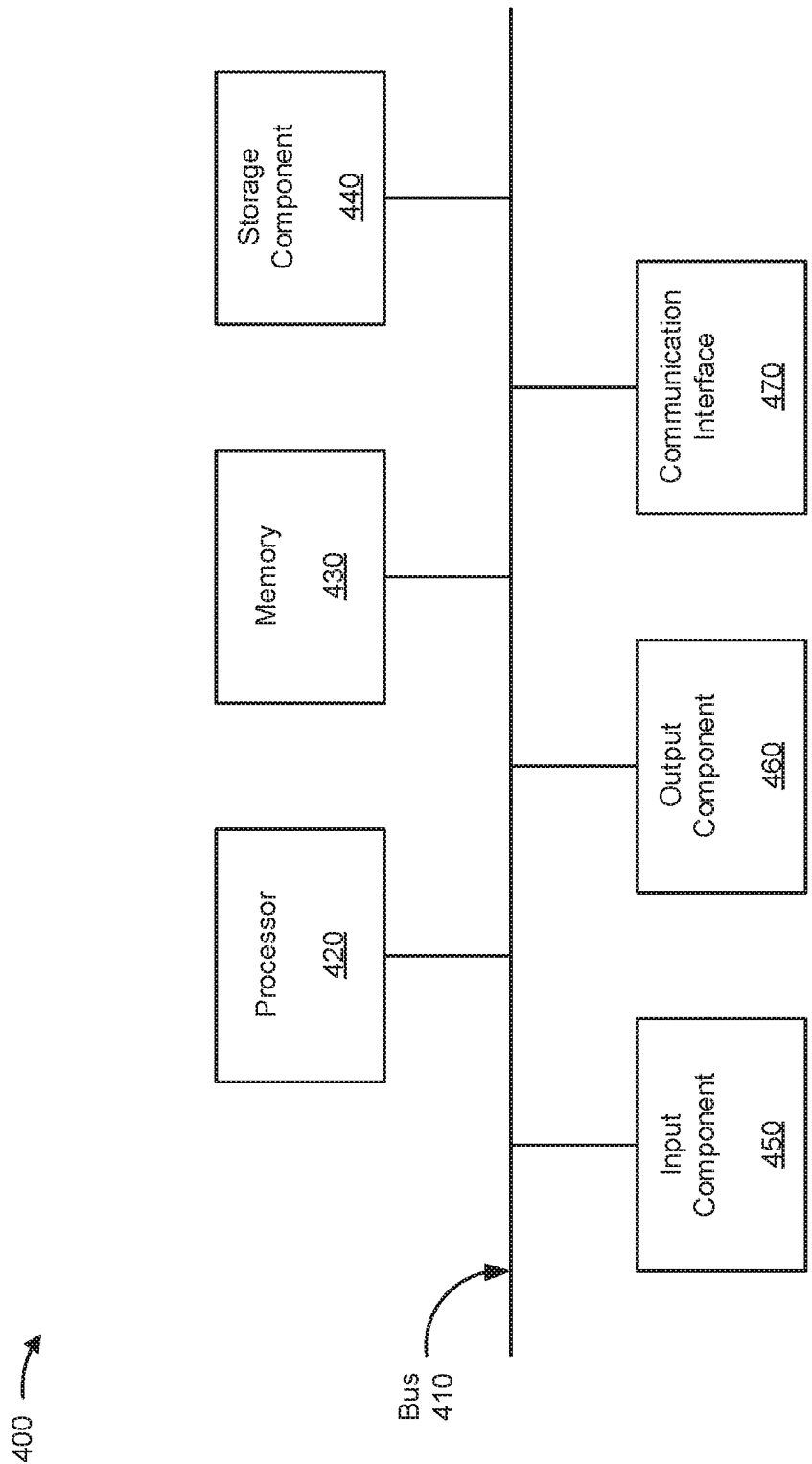
FIG. 4 is a diagram of example components of one or more devices of FIG. 3.

FIG. 4 is a diagram of example components of a device 400. Device 400 may correspond to user device 310, server device 320, emergency responder user device 330, and/or emergency dispatch user device 350. In some implementations, user device 310, server device 320, emergency responder user device 330, and/or emergency dispatch user device 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
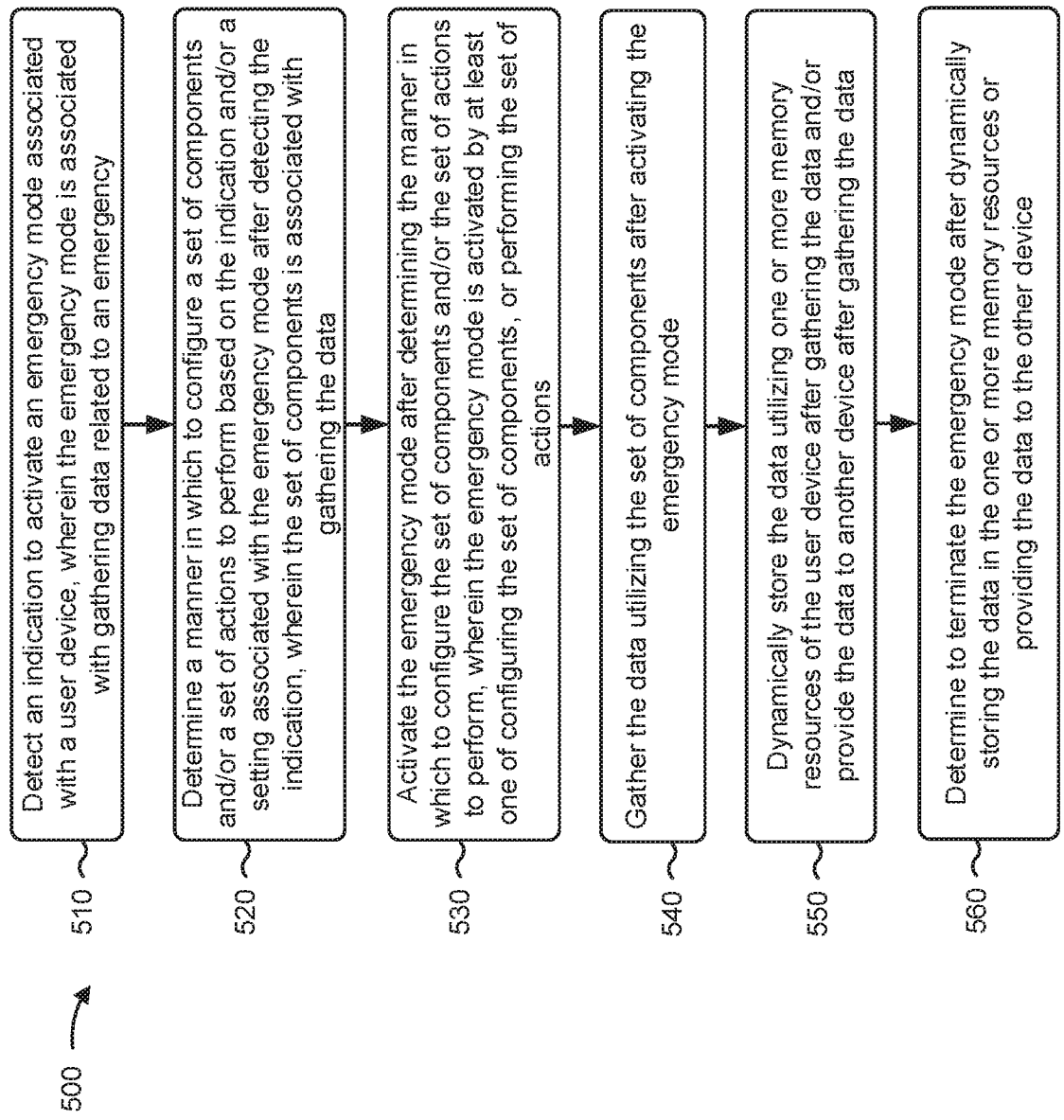
FIG. 5 is a flow chart of an example process for activating an emergency mode associated with a user device.

FIG. 5 is a flow chart of an example process 500 for activating an emergency mode associated with a user device. In some implementations, one or more process blocks of FIG. 5 may be performed by a user device (e.g., user device 310). In some implementations, one or more process blocks of FIG. 5 may be performed by another device or a group of devices separate from or including a user device, such as a server device (e.g., server device 320), an emergency responder user device (e.g., emergency responder user device 330), or an emergency dispatch user device (e.g., emergency dispatch user device 350).

As shown in FIG. 5, process 500 may include detecting an indication to activate an emergency mode associated with a user device, wherein the emergency mode is associated with gathering data related to an emergency (block 510). For example, the user device (e.g., user device 310 using processor 420, input component 450, communication interface 470, and/or the like) may detect an indication to activate an emergency mode associated with a user device, in a manner that is the same as or similar to that described with regard to FIGS. 1A-2C. In some implementations, the emergency mode may be associated with gathering data related to an emergency.

As further shown in FIG. 5, process 500 may include determining a manner in which to configure a set of components and/or a set of actions to perform based on the indication and/or a setting associated with the emergency mode after detecting the indication, wherein the set of components is associated with gathering the data (block 520). For example, the user device (e.g., user device 310 using processor 420, memory 430, storage component 440, and/or the like) may determine a manner in which to configure a set of components or a set of actions to perform based on the indication or a setting associated with the emergency mode after detecting the indication, in a manner that is the same as or similar to that described with regard to FIGS. 1A-2C. In some implementations, the set of components may be associated with gathering the data.

As further shown in FIG. 5, process 500 may include activating the emergency mode after determining the manner in which to configure the set of components and/or the set of actions to perform, wherein the emergency mode is activated by at least one of configuring the set of components, or performing the set of actions (block 530). For example, the user device (e.g., user device 310 using processor 420, memory 430, storage component 440, output component 460, and/or the like) may activate the emergency mode after determining the manner in which to configure the set of components or the set of actions to perform, in a manner that is the same as or similar to that described with regard to FIGS. 1A-2C. In some implementations, the emergency mode may be activated by at least one of configuring the set of components, or performing the set of actions.

As further shown in FIG. 5, process 500 may include gathering the data utilizing the set of components after activating the emergency mode (block 540). For example, the user device (e.g., user device 310 using processor 420, input component 450, and/or the like) may gather the data utilizing the set of components after activating the emergency mode.

As further shown in FIG. 5, process 500 may include dynamically storing the data utilizing one or more memory resources of the user device after gathering the data and/or providing the data to another device after gathering the data (block 550). For example, the user device (e.g., user device 310 using processor 420, memory 430, storage component 440, output component 460, communication interface 470, and/or the like) may dynamically store the data utilizing one or more memory resources of the user device after gathering the data, or providing the data to another device after gathering the data, in a manner that is the same as or similar to that described with regard to FIGS. 1A-2C.

As further shown in FIG. 5, process 500 may include determining to terminate the emergency mode after dynamically storing the data in the one or more memory resources or providing the data to the other device (block 560). For example, the user device (e.g., user device 310 using processor 420, input component 450, and/or the like) may determine to terminate the emergency mode after dynamically storing the data in the one or more memory resources or providing the data to the other device, in a manner that is the same as or similar to that described with regard to FIGS. 1A-2C.

Process 500 may include additional implementations, such as any single implementation or any combination of implementations described below and/or in connection with one or more other processes described elsewhere herein.

In some implementations, the user device may receive another indication after dynamically storing the data or providing the data, and may modify a manner in which the user device operates in the emergency mode after receiving the other indication. In some implementations, the set of components may include at least one of a light associated with the user device, a camera associated with the user device, a speaker associated with the user device, a microphone associated with the user device, and/or a global positioning system (GPS) component associated with the user device. In some implementations, the set of actions may include at least one of initiating a telephone call with an emergency dispatch center, initiating a video call with the emergency dispatch center, requesting that the other device output a notification related to the emergency to one or more other devices within a threshold proximity of the user device, outputting a sound via a speaker associated with the user device, or activating a light associated with the user device.

In some implementations, the data may include at least one of video data gathered via a camera associated with the user device, image data gathered via the camera, audio data gathered via a microphone associated with the user device, location data gathered via a global positioning system (GPS) component associated with the user device, or accelerometer data gathered via an accelerometer associated with the user device. In some implementations, the user device may detect another indication after dynamically storing the data or providing the data, and may determine to terminate the emergency mode after detecting the other indication. In some implementations, the user device may perform a lookup of the indication in a data structure stored by the user device after detecting the indication, and may determine the manner in which to configure the set of components or the set of actions to perform based on a result of the lookup.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
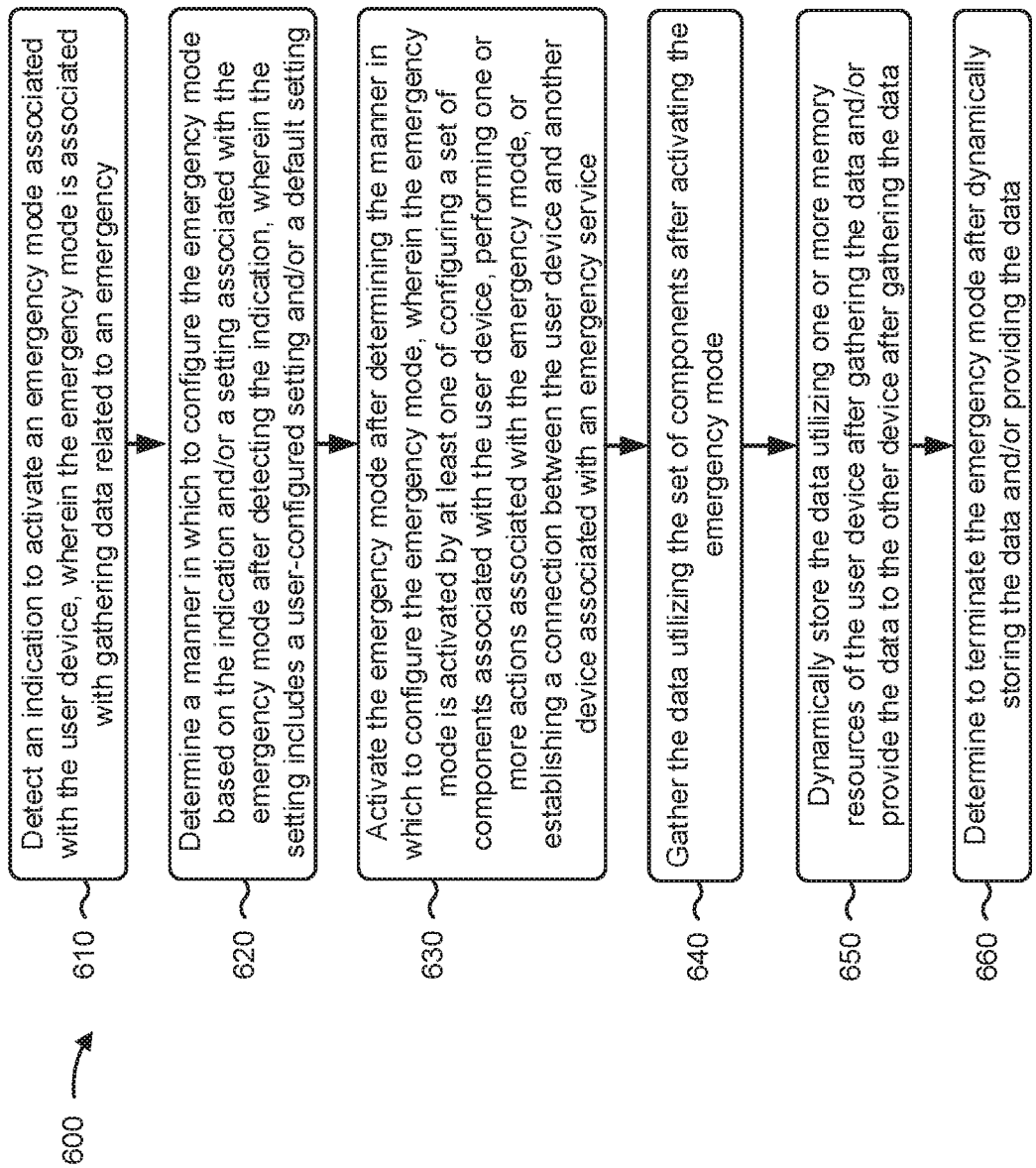
FIG. 6 is a flow chart of an example process for activating an emergency mode associated with a user device.

FIG. 6 is a flow chart of an example process 600 for activating an emergency mode associated with a user device. In some implementations, one or more process blocks of FIG. 6 may be performed by a user device (e.g., user device 310). In some implementations, one or more process blocks of FIG. 6 may be performed by another device or a group of devices separate from or including a user device, such as a server device (e.g., server device 320), an emergency responder user device (e.g., emergency responder user device 330), or an emergency dispatch user device (e.g., emergency dispatch user device 350).

As shown in FIG. 6, process 600 may include detecting an indication to activate an emergency mode associated with the user device, wherein the emergency mode is associated with gathering data related to an emergency (block 610). For example, the user device (e.g., user device 310 using processor 420, input component 450, communication interface 470, and/or the like) may detect an indication to activate an emergency mode associated with the user device, in a manner that is the same as or similar to that described with regard to FIGS. 1A-2C. In some implementations, the emergency mode may be associated with gathering data related to an emergency.

As further shown in FIG. 6, process 600 may include determining a manner in which to configure the emergency mode based on the indication and/or a setting associated with the emergency mode after detecting the indication, wherein the setting includes a user-configured setting and/or a default setting (block 620). For example, the user device (e.g., user device 310 using processor 420, memory 430, storage component 440, and/or the like) may determine a manner in which to configure the emergency mode based on the indication and/or a setting associated with the emergency mode after detecting the indication, in a manner that is the same as or similar to that described with regard to FIGS. 1A-2C. In some implementations, the setting may include a user-configured setting and/or a default setting.

As further shown in FIG. 6, process 600 may include activating the emergency mode after determining the manner in which to configure the emergency mode, wherein the emergency mode is activated by at least one of configuring a set of components associated with the user device, performing one or more actions associated with the emergency mode, or establishing a connection between the user device and another device associated with an emergency service (block 630). For example, the user device (e.g., user device 310 using processor 420, memory 430, storage component 440, output component 460, and/or the like) may activate the emergency mode after determining the manner in which to configure the emergency mode, in a manner that is the same as or similar to that described with regard to FIGS. 1A-2C. In some implementations, the emergency mode may be activated by at least one of configuring a set of components associated with the user device, performing one or more actions associated with the emergency mode, or establishing a connection between the user device and another device associated with an emergency service.

As further shown in FIG. 6, process 600 may include gathering the data utilizing the set of components after activating the emergency mode (block 640). For example, the user device (e.g., user device 310 using processor 420, input component 450, and/or the like) may gather the data utilizing the set of components after activating the emergency mode, in a manner that is the same as or similar to that described with regard to FIGS. 1A-2C.

As further shown in FIG. 6, process 600 may include dynamically storing the data utilizing one or more memory resources of the user device after gathering the data and/or providing the data to the other device after gathering the data (block 650). For example, the user device (e.g., user device 310 using processor 420, memory 430, storage component 440, output component 460, communication interface 470, and/or the like) may dynamically store the data utilizing one or more memory resources of the user device after gathering the data and/or provide the data to the other device after gathering the data, in a manner that is the same as or similar to that described with regard to FIGS. 1A-2C.

As further shown in FIG. 6, process 600 may include determining to terminate the emergency mode after dynamically storing the data or providing the data (block 660). For example, the user device (e.g., user device 310 using processor 420, input component 450, and/or the like) may determine to terminate the emergency mode after dynamically storing the data and/or providing the data, in a manner that is the same as or similar to that described with regard to FIGS. 1A-2C.

Process 600 may include additional implementations, such as any single implementation or any combination of implementations described below and/or in connection with one or more other processes described elsewhere herein.

In some implementations, the user device may determine that the user device is not receiving a signal with a threshold signal strength after gathering the data, and may store the data utilizing the one or more memory resources of the user device without providing the data to the other device after determining that the user device is not receiving the signal with the threshold signal strength. In some implementations, the user device may determine the manner in which to configure the emergency mode based on a combination of the indication and one or more other indications that the user device detected. In some implementations, different combinations of indications may be associated with different manners in which to configure the emergency mode. In some implementations, the indication may include at least one of a verbal command, a selection of a user interface element of a user interface provided for display via a display associated with the user device, a pattern input to a lock screen provided for display via the display associated with the user device, an access code input to the lock screen provided for display via the display, a threshold acceleration detected by an accelerometer associated with the user device, or a threshold deceleration detected by the accelerometer associated with the user device.

In some implementations, the other device may be associated with at least one of an emergency responder associated with the emergency service, or an emergency dispatch center associated with the emergency service. In some implementations, the user device may receive a request to establish the connection to the other device after activating the emergency mode. In some implementations, the other device may be associated with an emergency responder. In some implementations, the connection may be a secure connection between the user device and the other device. In some implementations, the user device may provide the data to the other device via the connection after receiving the request to establish the connection with the other device. In some implementations, the user device may detect that a signal associated with a network is associated with a threshold signal strength, and may provide the data to the other device without storing the data based on detecting that the signal associated with the network is associated with the threshold signal strength.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
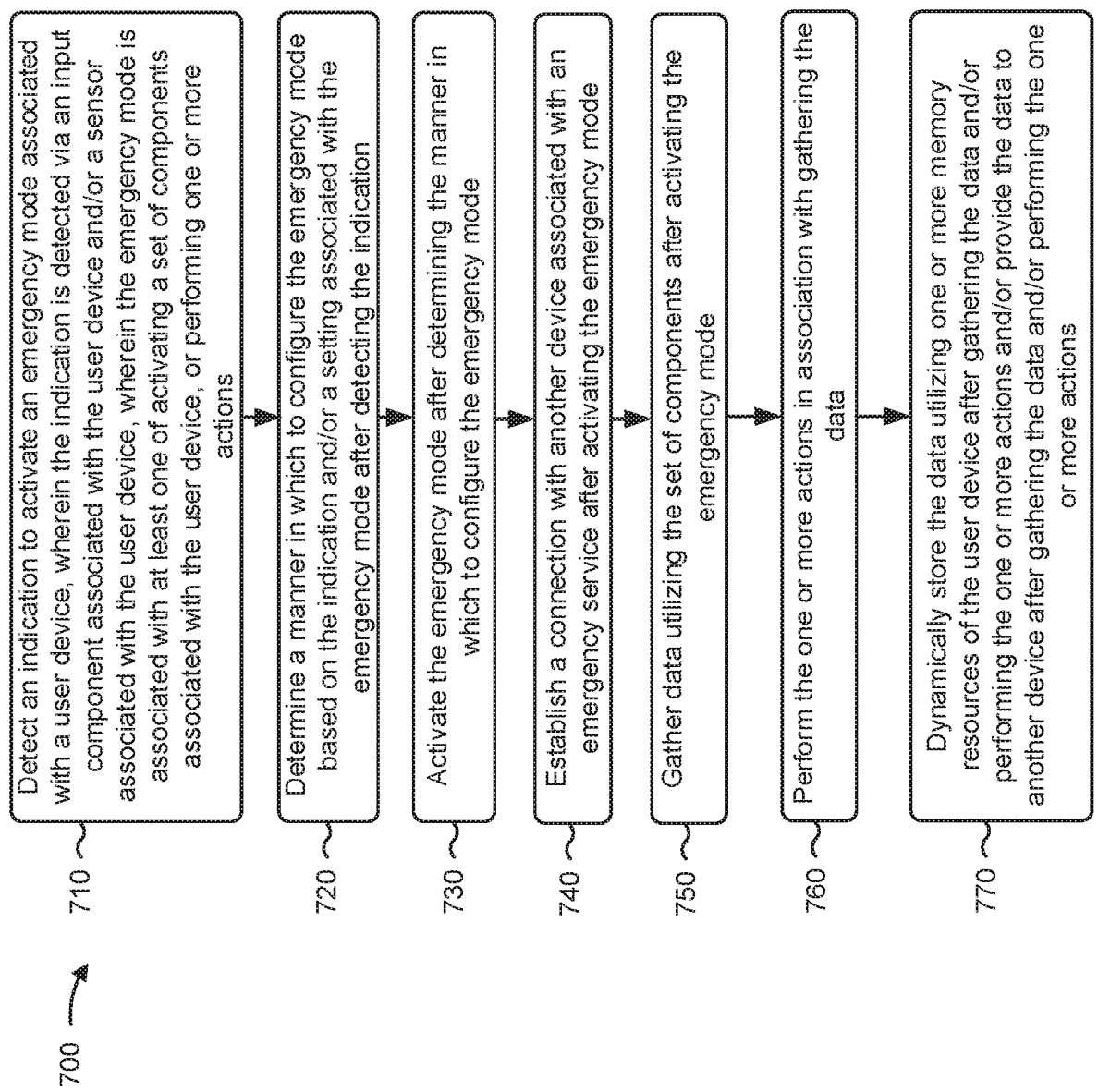
FIG. 7 is a flow chart of an example process for activating an emergency mode associated with a user device.

FIG. 7 is a flow chart of an example process 700 for activating an emergency mode associated with a user device. In some implementations, one or more process blocks of FIG. 7 may be performed by a user device (e.g., user device 310). In some implementations, one or more process blocks of FIG. 7 may be performed by another device or a group of devices separate from or including a user device, such as a server device (e.g., server device 320), an emergency responder user device (e.g., emergency responder user device 330), or an emergency dispatch user device (e.g., emergency dispatch user device 350).

As shown in FIG. 7, process 700 may include detecting an indication to activate an emergency mode associated with a user device, wherein the indication is detected via an input component associated with the user device and/or a sensor associated with the user device, wherein the emergency mode is associated with at least one of activating a set of components associated with the user device, or performing one or more actions (block 710). For example, the user device (e.g., user device 310 using processor 420, input component 450, communication interface 470, and/or the like) may detect an indication to activate an emergency mode associated with a user device, in a manner that is the same as or similar to that described with regard to FIGS. 1A-2C. In some implementations, the indication may be detected via an input component associated with the user device and/or a sensor associated with the user device. In some implementations, the emergency mode may be associated with at least one of activating a set of components associated with the user device, or performing one or more actions.

As further shown in FIG. 7, process 700 may include determining a manner in which to configure the emergency mode based on the indication and/or a setting associated with the emergency mode after detecting the indication (block 720). For example, the user device (e.g., user device 310 using processor 420, memory 430, storage component 440, and/or the like) may determine a manner in which to configure the emergency mode based on the indication and/or a setting associated with the emergency mode after detecting the indication, in a manner that is the same as or similar to that described with regard to FIGS. 1A-2C.

As further shown in FIG. 7, process 700 may include activating the emergency mode after determining the manner in which to configure the emergency mode (block 730). For example, the user device (e.g., user device 310 using processor 420, memory 430, storage component 440, output component 460, and/or the like) may activate the emergency mode after determining the manner in which to configure the emergency mode, in a manner that is the same as or similar to that described with regard to FIGS. 1A-2C.

As further shown in FIG. 7, process 700 may include establishing a connection with another device associated with an emergency service after activating the emergency mode (block 740). For example, the user device (e.g., user device 310 using processor 420, communication interface 470, and/or the like) may establish a connection with another device associated with an emergency service after activating the emergency mode, in a manner that is the same as or similar to that described with regard to FIGS. 1A-2C.

As further shown in FIG. 7, process 700 may include gathering data utilizing the set of components after activating the emergency mode (block 750). For example, the user device (e.g., user device 310 using processor 420, input component 450, and/or the like) may gather data utilizing the set of components after activating the emergency mode, in a manner that is the same as or similar to that described with regard to FIGS. 1A-2C.

As further shown in FIG. 7, process 700 may include performing the one or more actions in association with gathering the data (block 760). For example, the user device (e.g., user device 310 using processor 420, output component 460, communication interface 470, and/or the like) may perform the one or more actions in association with gathering the data, in a manner that is the same as or similar to that described with regard to FIGS. 1A-2C.

As further shown in FIG. 7, process 700 may include dynamically storing the data utilizing one or more memory resources of the user device after gathering the data and/or performing the one or more actions and/or providing the data to another device after gathering the data and/or performing the one or more actions (block 770). For example, the user device (e.g., user device 310 using processor 420, memory 430, storage component 440, output component 460, communication interface 470, and/or the like) may dynamically store the data utilizing one or more memory resources of the user device after gathering the data and/or performing the one or more actions and/or provide the data to another device after gathering the data and/or performing the one or more actions, in a manner that is the same as or similar to that described with regard to FIGS. 1A-2C.

Process 700 may include additional implementations, such as any single implementation or any combination of implementations described below and/or in connection with one or more other processes described elsewhere herein.

In some implementations, the user device may determine that the connection with the other device is not associated with a threshold signal strength after gathering the data, and may store the data utilizing the one or more memory resources without providing the data to the other device after determining that the connection is not associated with the threshold signal strength. In some implementations, the user device may detect the indication based on at least one of a verbal command received via a microphone associated with the user device, a pattern input to a lock screen provided for display via a display associated with the user device, an access code input to the lock screen, a threshold acceleration detected by an accelerometer associated with the user device, or a threshold deceleration detected by the accelerometer associated with the user device.

In some implementations, the user device may activate a light associated with the user device at a particular interval. In some implementations, the user device may output a particular sound at a particular interval via a speaker associated with the user device. In some implementations, the user device may configure the set of components associated with the user device after determining the manner in which to configure the emergency mode.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, a user device provides a tool that can aid an individual and/or an emergency responder in an emergency by facilitating automatic performance of various actions after detecting an indication to activate an emergency mode. This improves the provisioning of emergency services to an individual experiencing an emergency by facilitating access to the emergency services in situations when the individual would not otherwise be capable of accessing the emergency services. In addition, this conserves resources of an emergency service (e.g., time, personnel, and/or the like) by providing the emergency service with accurate and/or real-time data related to an emergency in a manner not previously possible.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a user device, an indication to activate an emergency mode associated with the user device,
   wherein the indication is one of a plurality of previously configured emergency indications for which the user device is monitoring inputs, and
   wherein detecting the indication comprises:
   detecting at least one occurrence of a first type of indication,
   detecting at least one occurrence of a second type of indication,
   the at least one occurrence of the first type of indication occurring after the at least one occurrence of the second type of indication, and
   detecting the indication based on a combination of a threshold number of occurrences of the first type of indication and a threshold number of occurrences of the second type of indication occurring in a particular order and occurring within a threshold amount of time;
   wherein the first type of indication comprises one of:
   a verbal command received by an audio component associated with the user device,
   a selection of a user interface element of a user interface provided for display via a display associated with the user device,
   a threshold acceleration or deceleration detected by an accelerometer associated with the user device,
   a gas measurement detected by a gas detector associated with the user device,
   a temperature measurement obtained from a temperature measurement component associated with the user device, or
   location data obtained from a location detection component associated with the user device, and
   wherein the second type of indication comprises a different one of:
   another verbal command received by the audio component associated with the user device,
   another selection of another user interface element of another user interface provided for display via the display associated with the user device,
   another threshold acceleration or another deceleration detected by the accelerometer associated with the user device,
   another gas measurement detected by the gas detector associated with the user device,
   another temperature measurement obtained from the temperature measurement component associated with the user device, or
   other location data obtained from the location detection component associated with the user device;
   identifying, by the user device and using a data structure mapping the plurality of previously configured emergency indications to one or more actions to be performed, an action, of the one or more actions, to be performed by a component of the user device,
   the mapping including information identifying, for different indications, different sets of actions to be performed;
   activating, by the user device, the emergency mode after identifying the action; and
   performing, by the user device and using the component, the action.

2. The method of claim 1, wherein the action comprises:
   activating at least one hardware component of the user device.

3. The method of claim 1, further comprising:
   monitoring, via an application installed on the user device, the user device for the plurality of previously configured emergency indications.

4. A device, comprising:
   one or more memories; and
   one or more processors, communicatively coupled to the one or more memories, configured to:
   detect an indication to activate an emergency mode associated with the device, the indication being one of a plurality of previously configured emergency indications, and
   wherein the one or more processors, when detecting the indication, are to:
   detect at least one occurrence of a first type of indication,
   detect at least one occurrence of a second type of indication,
   the at least one occurrence of the first type of indication occurring after the at least one occurrence of the second type of indication, and
   detect the indication based on a combination of a threshold number of occurrences of the first type of indication and a threshold number of occurrences of the second type of indication occurring in a particular order and occurring within a threshold amount of time;
   wherein the first type of indication comprises one of:
   a verbal command received by an audio component associated with the device,
   a selection of a user interface element of a user interface provided for display via a display associated with the device,
   a threshold acceleration or deceleration detected by an accelerometer associated with the device,
   a gas measurement detected by a gas detector associated with the device,
   a temperature measurement obtained from a temperature measurement component associated with the device, or
   location data obtained from a location detection component associated with the device, and
   wherein the second type of indication comprises a different one of:
   another verbal command received by the audio component associated with the device,
   another selection of another user interface element of another user interface provided for display via the display associated with the device,
   another threshold acceleration or another deceleration detected by the accelerometer associated with the device,
   another gas measurement detected by the gas detector associated with the device,
   another temperature measurement obtained from the temperature measurement component associated with the device, or
   other location data obtained from the location detection component associated with the device;
   identify, using a data structure mapping the plurality of previously configured emergency indications to one or more actions to be performed, an action, of the one or more actions, to be performed by a component of the device, the mapping including information identifying, for different indications, different sets of actions to be performed;

activate the emergency mode after identifying the action; and perform, using the component, the action.

5. The device of claim 4, wherein the action comprises: activating at least one hardware component of the device.

6. The device of claim 4, wherein the one or more processors are further configured to:

monitor, via an application installed on the device, the device for the plurality of previously configured emergency indications.

7. A non-transitory computer-readable medium storing a set of instructions, the set of instructions comprising:

one or more instructions that, when executed by one or more processors of a device, cause the device to:

detect an indication to activate an emergency mode associated with the device, the indication being one of a plurality of previously configured emergency indications for which the device is monitoring inputs, wherein the one or more instructions, that cause the one or more processors to detect the indication, cause the one or more processors to:

detect at least one occurrence of a first type of indication, detect at least one occurrence of a second type of indication, the at least one occurrence of the first type of indication occurring after the at least one occurrence of the second type of indication, and detect the indication based on a combination of a threshold number of occurrences of the first type of indication and a threshold number of occurrences of the second type of indication occurring in a particular order and occurring within a threshold amount of time; and wherein the first type of indication comprises one of:

a verbal command received by an audio component associated with the device, a selection of a user interface element of a user interface provided for display via a display associated with the device, a threshold acceleration or deceleration detected by an accelerometer associated with the device, a gas measurement detected by a gas detector associated with the device, a temperature measurement obtained from a temperature measurement component associated with the device, or location data obtained from a location detection component associated with the device, and wherein the second type of indication comprises a different one of:

another verbal command received by the audio component associated with the device, another selection of another user interface element of another user interface provided for display via the display associated with the device, another threshold acceleration or another deceleration detected by the accelerometer associated with the device, another gas measurement detected by the gas detector associated with the device, another temperature measurement obtained from the temperature measurement component associated with the device, or other location data obtained from the location detection component associated with the device;

identify, using a data structure mapping the plurality of previously configured emergency indications to one or more actions to be performed, an action, of the one or more actions, to be performed by a component of the device, the mapping including information identifying, for different indications, different sets of actions to be performed;

activate the emergency mode after identifying the action; and activate, based on identifying the action, at least one hardware component of the device.

8. The non-transitory computer-readable medium of claim 7, wherein the action comprises deactivation of the component; and the one or more instructions further cause the device to: deactivate the component.

9. The non-transitory computer-readable medium of claim 7, wherein the one or more instructions further cause the device to:

monitor, via an application installed on the device, the device for the plurality of previously configured emergency indications.

10. The method of claim 1, wherein at least one of the selection of the user interface element, or the other selection of the other user interface element, comprises a pattern input to a lock screen interface.

11. The method of claim 1, wherein at least one of the selection of the user interface element, or the other selection of the other user interface element, comprises an access code input to a lock screen interface.

12. The method of claim 1, further comprising:

obtaining updated location data indicating an updated location associated with the user device; and deactivating the emergency mode based on the updated location.

13. The method of claim 1, wherein the location detection component comprises a global positioning system (GPS) component.

14. The device of claim 4, wherein at least one of the selection of the user interface element, or the other selection of the other user interface element, comprises a pattern input to a lock screen interface.

15. The device of claim 4, wherein at least one of the selection of the user interface element, or the other selection of the other user interface element, comprises an access code input to a lock screen interface.

16. The device of claim 4, wherein the one or more processors are further to:

obtain updated location data indicating an updated location associated with the device; and deactivate the emergency mode based on the updated location.

17. The device of claim 4, wherein the location detection component comprises a global positioning system (GPS) component.

18. The non-transitory computer-readable medium of claim 7, wherein at least one of the selection of the user interface element, or the other selection of the other user interface element, comprises a pattern input to a lock screen interface.

19. The non-transitory computer-readable medium of claim 7, wherein at least one of the selection of the user interface element, or the other selection of the other user interface element, comprises an access code input to a lock screen interface.

20. The non-transitory computer-readable medium of claim 7, wherein the one or more instructions further cause the device to:
- obtain updated location data indicating an updated location associated with the device; and
- deactivate the emergency mode based on the updated location.

* * * * *